United States Patent [19]

Woollatt et al.

[11] Patent Number: 4,913,187

[45] Date of Patent: * Apr. 3, 1990

[54] COMPRESSOR VALVE WITH FLAT SPRING

[75] Inventors: Derek Woollatt, Campbell, N.Y.; George J. Safford, Quincy, Ill.

[73] Assignee: Dresser Industries, Dallas, Tex.

[*] Notice: The portion of the term of this patent subsequent to Dec. 26, 2006 has been disclaimed.

[21] Appl. No.: 258,125

[22] Filed: Oct. 11, 1988

Related U.S. Application Data

[62] Division of Ser. No. 86,526, Aug. 17, 1987.

[51] Int. Cl.$^4$ .............................................. F16K 15/10
[52] U.S. Cl. .......................... 137/516.13; 137/516.21
[58] Field of Search ................... 137/516.11, 516.13, 137/516.15, 516.17, 516.19, 516.21, 516.23

[56] References Cited

U.S. PATENT DOCUMENTS 3,123,095  3/1964  Kohler ........................... 137/516.23

FOREIGN PATENT DOCUMENTS

1010791  6/1957  Fed. Rep. of Germany ......................... 137/516.21
543016  2/1942  United Kingdom ........... 137/516.13

Primary Examiner—Robert G. Nilson
Attorney, Agent, or Firm—Sigalos, Levine & Montgomery

[57] ABSTRACT

A sealing apparatus for use in a compressor suction or pressure plate valve having a seat member with a plurality of fluid passage ports therethrough. The sealing apparatus comprises a movable plastic plate member having a like plurality of sealing members for juxtaposed sealing engagement with the plurality of fluid passage ports and at least one projection integrally formed on at least one of the sealing members and extending outwardly from the plate member in a direction away from the seat member for receiving a resilient flat spring member urging the plate member against and sealing the fluid passage ports.

3 Claims, 4 Drawing Sheets

COMPRESSOR VALVE WITH FLAT SPRING

This application is a division, of application Ser. No. 086,526, filed Aug. 17, 1987 pending.

BACKGROUND OF THE INVENTION

The present invention relates to the design of compressor valves and in particular to a compressor valve which has a simplified design, reduced cost, improved reliability and reduced clearance volume of the valve and hence increased compressor capacity. Specifically, the invention allows the use of an easily manufactured flat biasing spring member to maintain the valve plate member in its closed position.

Suction or pressure valves for use in a piston compressor are usually constructed with a valve seat having concentrically arranged, ring-shaped, fluid flow passages. A plate member having concentrically arranged ring members in juxtaposed relationship with the fluid passages normally seals the passages and prevents fluid from passing therethrough. A spring plate rests upon the plate member and spring members bias the plate member against the fluid passages to maintain a sealed relationship and prevent fluid from passing therethrough. When the pressure becomes sufficiently great in the passages, the plate member is forced outwardly against the spring plate and opens the fluid flow passages allowing the fluid to pass through the valve. When the pressure decreases sufficiently, the spring members force the plate member against the passages which once again maintains them in a sealed relationship. Such spring members may include a coiled spring as disclosed in U.S. Pat. Nos. 4,307,751 and 4,184,508, a curved spring plate as disclosed in U.S. Pat. No. 3,945,397 or a flat spring which also serves as the plate member as disclosed in U.S. Pat. No. 4,164,238.

The coiled springs disclosed in U.S. Pat. Nos. 4,307,751 and 4,184,508 are unsatisfactory because they require a greater space or volume in the valve itself, thus decreasing the compressor capacity. It would be desirable to make the valve considerably smaller in order to increase compressor capacity. The curved spring plates as disclosed in U.S. Pat. No. 3,945,397 are unsatisfactory because the resilient arms of the plate must be bent or curved in a fixed deformable shape and the spring material must be bent in such a way that it is not stressed. It is considerably easier to make a flat spring. U.S. Pat. No. 4,164,238 uses such a flat spring but it is unsatisfactory since the spring is rigidly attached to the valve seat having the arcuate shaped fluid flow passages and is in fact the plate member for sealing these passages. The flat spring plate is rigidly attached to the valve seat at two locations. When sufficient pressure is provided in the fluid flow passages or ports, it tends to bend the flat plate about the attachment points to uncover the fluid flow ports and allow the fluid to pass through the valve. There is very little movement that can take place by bending the spring plate when it is rigidly attached to and forms the plate which seals the valve seat ports. Further, the passages are not uniformly uncovered and thus fluid flow through the passages is not uniform. Further, the spring plate material is dictated by its spring function precluding the use of desirable non-metallic plate materials.

The present invention overcomes the disadvantages of the prior art by providing a valve for a piston compressor which is smaller in volume than prior art valves because of its flat spring construction and which also has a movable plate member formed with flat concentric sealing members which seal corresponding ones of the fluid flow ports of the valve seat. The movable plate member is biased in that sealing position by the flat spring. The plate member is allowed to move axially toward the spring plate when sufficient pressure is developed in the fluid flow ports and thus bends or deforms at least part of the spring plate so that the fluid can move through the fluid ports. The spring plate is rigidly attached to a guard member in spaced relationship with the valve seat.

The plate member which seals the fluid ports of the valve seat has projections on the flat concentric sealing members which extend toward and contact fingerlike arcuate projections on the spring plate. The spring fingers bias the plate member against the valve seat and thus seal the fluid flow ports. When sufficient pressure is applied in the fluid flow ports, the plate member is forced by the fluid pressure toward the spring member and the projections on the plate member cause the spring like fingers on the spring plate to bend or flex thus allowing the entire sealing plate member to move away from all of the fluid flow ports simultaneously and uniformly and allow the pressurized fluid to pass through the valve. When the pressure is reduced sufficiently, the spring like fingers pressing against the projections on the plate member force the plate member back to its original position against the valve seat and thus seal the fluid flow ports.

A hollow cylindrical spacer extends through an orifice in the plate member and contacts both the valve seat and the spring plate thus maintaining a fixed separation between the spring plate and the valve seat while simultaneously allowing the plate member to move away from the valve seat toward the spring plate. A guard member surrounds the spring plate, and the sealing plate member and is attached to the valve seat to hold the entire compressor valve together as an integral unit. Guide pins extend through arms in the guard plate, the spring plate and the plate member into orifices in the valve seat to align the spring plate and the plate member and prevent them from rotating with respect to the valve seat or each other.

An important aspect of this case is that the sealing plate member can be made of plastic. Plastic has the ability to resist impact fatigue, resist corrosion, tolerate dirt by embedding the particles without allowing fluid leakage and is light weight. Plastic can be injection molded to form the sealing plate members with the projections on one side thereof in a relatively economical manner. However, such molded plastic plate must have flat sealing surfaces in order to properly seal the fluid passages in the valve seat. Because of the construction of this valve with a flat spring plate and the novel plastic sealing plate, the valve is smaller than those in the prior art which enables a smaller compressor to do the same job.

Thus it is an object of the present invention to provide and improve the movable sealing plate member for a compressor valve with the sealing plate member being formed of plastic and having a plurality of flat sealing members for juxtaposed sealing engagement with a like plurality of fluid passage ports in the valve seat member and at least two projections formed on the sealing members of the plate member and extending outwardly from the plate member in a direction away from the valve seat member for receiving a spring member urging sealing members of the plate member against and sealing the fluid passage ports in the valve seat member.

It is also an object of the present invention to provide the movable plate member with a plurality of arcuate concentric rings forming the flat sealing members and having projections on one side thereof and including means for enabling the plate to move axially away from the valve seat member to uncover the fluid passage ports.

It is still another object of the present invention to provide a flat spring plate in juxtaposed abutting relationship with a sealing plate member which has at least two projections formed on sealing members and with at least one spring finger extending from a central portion of said flat spring plate and resting on a corresponding one of the projections on the plate member sealing members for holding the plate in sealing engagement with the fluid passage ports and enabling the plate member to be forced against the spring member to bend the spring fingers and uncover the fluid passage ports.

It is still another object of the present invention to provide at least two arms radially extending from the central portion of a spring plate with at least one spring finger extending arcuately from each of the arms to rest upon a corresponding one of the projections on the movable plate to bias the movable plate against and seal the fluid passage ports in the seat member.

It is yet another object of the present invention to provide a plate valve for a compressor, the valve comprising a seat member having fluid passage ports therein, a movable plate member in contact with and controlling the flow of fluid through the ports, the plate member having at least one integrally formed projection on one side thereof, and a flat stationary spring plate having spring fingers thereon to contact the plate member projection to bias the plate member against and seal the fluid passage ports.

SUMMARY OF THE INVENTION

Thus the invention relates to a sealing apparatus for use in a compressor suction or pressure valve having a seat member with a plurality of fluid passage ports therethrough, said sealing apparatus comprising a movable plate member having a like plurality of sealing members for juxtaposed sealing engagement with the plurality of fluid passage ports and at least one projection integrally formed on at least one of the sealing members and extending outwardly from the plate member in a direction away from the seat member for receiving a resilient flat spring member urging the plate member against and sealing the fluid passage ports.

The invention also relates to a plate valve comprising a seating member having fluid passage ports therein, a rigid, movable plate member for controlling the flow of fluid through said ports, said plate member having at least one projection on one side thereof, and a flat, stationary spring plate having at least one resilient spring finger thereon in contact with said at least one plate member projection to bias said plate against and seal said fluid passage ports until sufficient fluid pressure in said ports forces said plate member against and bends said spring fingers thereby uncovering said fluid passage ports to allow fluid passage through said valve.

The invention further relates to a method of forming a plate valve comprising the steps of forming fluid passage ports in a seating member, controlling the flow of fluid through said ports with a rigid, movable plate member, forming at least one projection on one side of said plate member and contacting said at least one plate member projection with a corresponding resilient spring finger extending from a flat, stationary spring plate to bias said plate member against and seal said fluid passage ports until sufficient fluid pressure in said ports forces said plate member against and bends said spring fingers thereby uncovering said fluid passage ports to allow fluid passage through said valve.

BRIEF DESCRIPTION OF THE DRAWINGS

These and other objects of the present invention will be described more fully with the accompanying drawings in which like numerals represent like elements and in which.

DETAILED DESCRIPTION OF THE DRAWINGS

Figure 1:
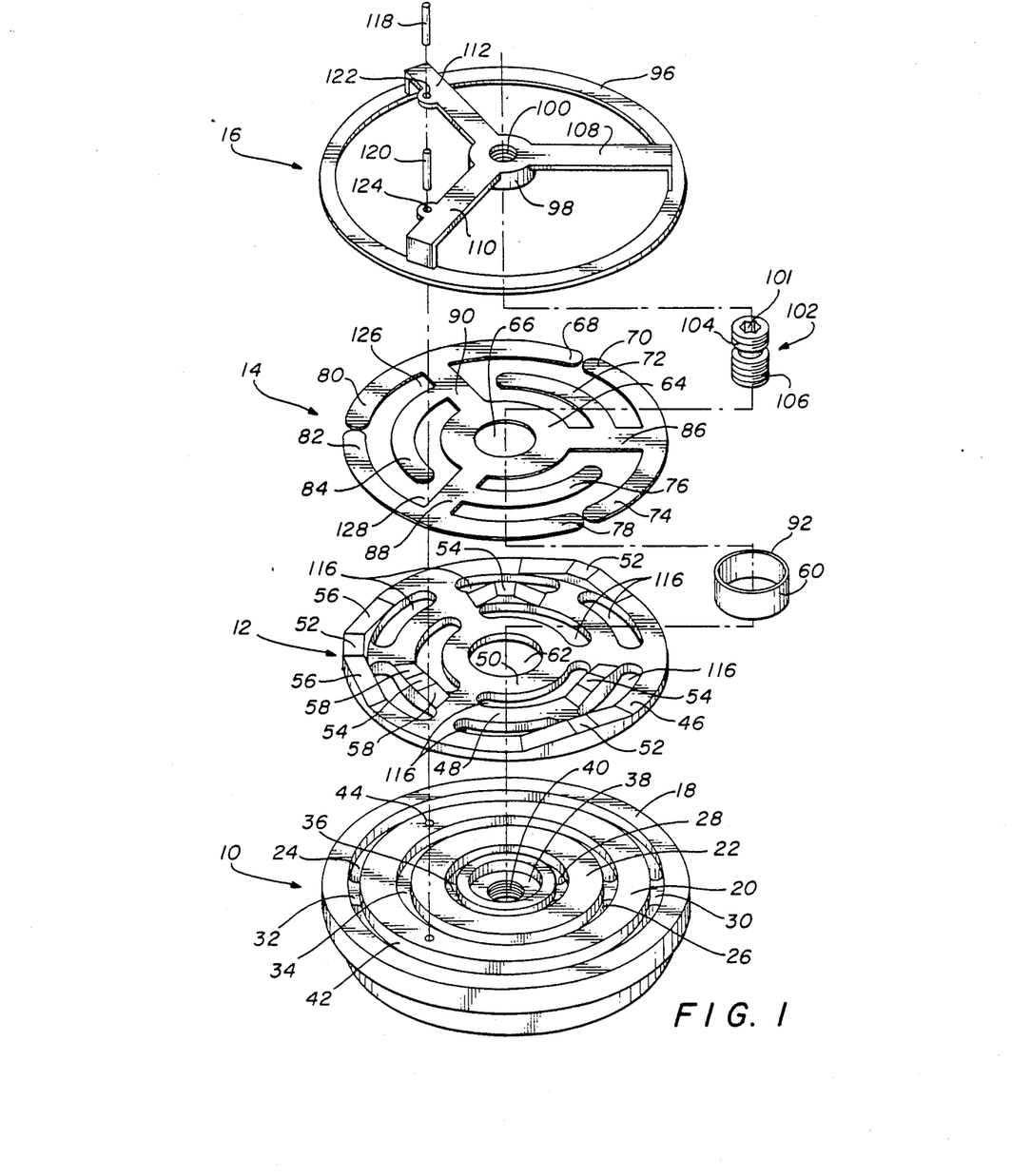
FIG. 1 is an exploded view of the novel plate valve of the present invention.

FIG. 1 is an exploded view of the novel plate valve. It comprises four major elements including the seat member 10, movable plate member 12, flat spring plate 14 and guard 16.

Seat member 10 is formed from a plurality of concentric rings 18, 20 and 22 having fluid passage ports 24, 26 and 28 formed in an arcuate fashion in the grooves which separate the concentric rings 18, 20 and 22. The concentric rings 18, 20 and 22 are maintained in their rigid relationship to each other by connecting members such as 30, 32, 34 and 36. A circular recess 38 is formed in the center of the seating member 10 and a threaded orifice 40 is located in the center of the circular recess. The threaded orifice 40 may extend completely through the seat member 10 to the other side although it is shown formed only partially into the seat member 10. First and second orifices 42 and 44 are formed in concentric ring 20 to be used with guide pins 118 and 120 in guard 16 as will be disclosed hereafter. In like manner, the concentrically disposed arcuate fluid passage ports 24, 26 and 28 extend completely through the seat member 10 to the other side.

Movable plate member 12 has a plurality of concentric arcuate sealing members 46, 48 and 50 for juxtaposed sealing engagement with the plurality of concentrically disposed arcuate fluid passage ports 24, 26 and 28 of the seat member 10. This means of course, that the plate (and its sealing members 46, 48 and 50) must be flat and not warped or deformed. The thickness of plate member 12 is determined by the working pressure it is to encounter. A plurality of projections 52 are formed on one side of the arcuate sealing member 46 and a like plurality of projections 54 are formed on the same side of arcuate sealing member 48. These projections are positioned to enable even loading on the plate member 12 and thus prevent the plate member 12 from cocking. They extend outwardly from the movable plate 12 in a direction away from the seating member 10 for receiving a corresponding resilient spring member formed on flat spring plate 14 which urges the plate member 12 against and seals the arcuate fluid passage ports 24, 26, and 28. The projections 52 and 54 may have sloping or tapered surfaces 56 and 58 to provide sliding support as the movable plate member 12 moves toward and bends the spring fingers of the flat spring plate 14. Such tapered surfaces 56 and 58 are not necessary but are preferred to provide sure control of the rate of change of spring pressure by shifting the contact point with the spring toward its fixed end. Projections 52 and 54 are separated circumferentially and radially from each other to accommodate the spring fingers. The projections 52 and 54 may have identical heights or, if desired, may have different heights to create a variable pressure on plate member 12 with change in distance of movement of plate member 12. Thus if projections 52 on the surface of outer member 46 have a greater height than projections 54 on inner member 48, the first movement of plate member 12 will be resisted by the spring fingers seated on projections 52. After plate member 12 moves a distance equal to the difference in the heights of the two projections 52 and 54, projections 54 will contact their respective spring fingers and additional spring pressure will be brought to bear on the plate member 12. Thus the spring fingers will absorb greater energy from the moving plate member 12 near the end of its travel path.

A hollow cylindrical spacer 60 has an outside diameter equal to or less than the diameter of orifice 62 in movable plate member 12 and circular recess 38 in the center of seat member 10. Thus the hollow cylindrical spacer 60 fits snugly in the recess 38 of seat member 10 and allows the movable plate member 12 to move axially about the hollow cylindrical spacer 60 and away from seat member 10 toward flat spring plate 14.

Flat spring plate 14 is located in juxtaposed abutting relationship with the plate member 12 and has a central portion 64 with an orifice 66 in the center thereof. Resilient spring fingers 68, 70, 72, 74, 76, 78, 80, 82 and 84 extend from the central portion 64 by means of arms 86, 88 and 90 which extend radially from the central portion 64. It is not essential but it is preferred that the spring fingers 68, 70, 72, 74, 76, 78, 80, 82 and 84 all have the same arcuate length to give maximum uniform force with minimum stress at all contact points. Thus fingers extend arcuately from each of the arms 86, 88, and 90 respectively at two different radii and rest upon a corresponding one of the projections 52 and 54 on movable plate member 12 to bias the movable plate member against and seal the fluid passage ports 24, 26 and 28 of seat member 10. As many fingers can be added as needed for a particular valve. The length of the spring fingers 68–84 determine the positions of the corresponding projections 52 and 54 on movable plate member 12. The force exerted by the spring plate 14 varies with the length of the spring fingers 68–84. The shorter the finger length, the greater the force exerted.

The diameter of orifice 66 in flat spring plate 14 is less than the inside diameter of the hollow cylindrical spacer 60. Thus the center portion 64 of flat spring plate 14 rests on and abuts against the upper surface 92 of hollow cylindrical spacer 60. The height of spacer 60 is just sufficient to hold flat spring plate 14 a fixed distance from seat member 10 and yet allow the spring fingers 68–84 to rest on corresponding ones of the projections 52 and 54 on movable plate 12 with a predetermined bias pressure. Guard member 16 rests on flat spring plate 14 and by means of a stud 102 attaches to the seating member 10 such that the spring plate 14 is held in fixed relationship with the seating member 10 while allowing the plate member 12 to move axially about the hollow cylindrical spacer 60 towards the spring plate 14. Thus, the spring plate fingers 68–84 are bent as movable plate 12 is forced by fluid pressure towards spring plate 14 thus uncovering the fluid passage ports 24, 26 and 28 in seating member 10.

Guard member 16 comprises a circular ring 96 which rests on the outer edge of outer concentric ring 18 of seat member 10. A central cylindrical portion 98 has an outside diameter substantially equal to or less than the inside diameter of the hollow cylindrical spacer 60 for insertion through the spring plate orifice 66 and into the hollow cylindrical spacer 60. A threaded orifice 100 extends through the central cylindrical portion 98 of guard member 16. A threaded stud 102 has a first threaded portion 104 (either right or left hand but preferably left hand) which engages the threaded orifice 100 in the central cylindrical portion 98 of guard 16 and a second threaded portion 106 (of opposite thread hand left or right to first threaded poriton 104) which engages the threaded orifice 40 in the valve seat member 10 thereby attaching the guard 16 securely to valve seat member 10. An internal hex 101 is formed in the stud 102 to enable it to be readily inserted or removed with an Allen wrench. A plurality of arms 108, 110 and 112 extend radially between the central cylindrical portion 98 and the circular ring 96 to form a unitary guard element 16. Thus, guard element 16 in combination with the hollow cylindrical spacer 60 allows the entire plate valve comprised of parts 10, 12, 14 and 16 to be formed in a unitary assembly.

Figure 5:
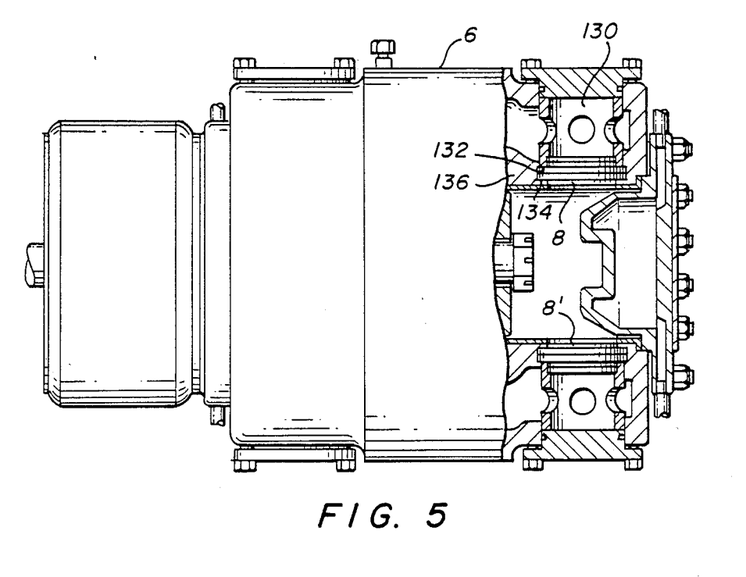
FIG. 5 is a partial cross-section of a compressor illustrating the location and mounting of the plate valves therein.

As can be seen in FIG. 5 the plate valve 8 serves as an input valve in compressor 6 and plate valve 8' serves as an output valve in compressor 6. It will be noted that cylindrical body 130 has a shoulder 132 which rests on the outer ledge 11 (FIG. 3) of guard 16. It will also be seen that shoulder 134 of frame portion 136 rests against the outer edge 96 on the underside of valve seat member 10. Plate valve 8' is reversed in the other side of compressor 6. Thus plate valves 8 and 8' are rigidly held in position in the compressor. Because of this mounting arrangement, the guard 16 serves to prevent damage to the compressor if stud 102 should fail. To prevent any part of a broken stud 102 working its way into the compressor, the orifice 100 in the center cylindrical portion 98 of guard 16 is tapped from the surface installed closer to the seat 10 and is not threaded all the way through the other surface. In such case, all of the elements of valves 8 and 8' would be maintained in their proper relationship by shoulder 132 of cylindrical body 130 resting on the outer ledge 11 and shoulder 134 resting against outer edge 96 of guard 16. It will be understood that the plate valves 8 and 8' will function properly without guard 16. Guard 16, as indicated, captures stud 102 if it fails, serves as a stop for plate member 12 and is a support for spring plate 14. All of the above features, except capturing stud 102, could be accomplished with the use of a bolt and washer positioned over the center position 64 of spring plate 14 and threadedly engaging an orifice in stud 102 or directly into seat orifice 40. The use of guard 16 is preferred, however.

In operation either as a pressure valve or a suction valve, plate member 12 with sealing members 46, 48 and 50 rest on and seal arcuate fluid ports 24, 26 and 28 of valve seat member 10. The spring fingers 68-84 of flat spring plate 14 rest on corresponding projections 52 and 54 on one side of the sealing members 46, 48 and 50 of the movable plate member 12 thus biasing the plate member 12 against valve seat member 10 to securely seal the fluid ports 24, 26 and 28. When the pressure of the fluid in the arcuate fluid ports 24, 26 and 28 of seat member 10 becomes sufficiently great, either due to pressure or suction from the compressor, the plate member 12 is forced away from seat member 10 towards flat spring plate 14. Since projections 52 and 54 on movable plate member 12 are resting against the spring fingers 68-84 of flat spring plate 14, the moving action of plate 12 forces spring fingers 68-84 outwardly through bending and thus plate member 12 is allowed to move toward flat spring plate 14 even though the central portion 64 of flat spring plate 14 is held stationary or fixed with respect to seat member 10. This action, of course, uniformly opens the fluid ports 24, 26 and 28 and allows the fluid in fluid ports 24, 26 and 28 of valve seat member 10 to pass through the valve including orifices 116 of movable plate 12. With the novel arrangement of the present invention, the plate member 14 can move a much greater range of travel than in the prior art valves. As the plate member 14 moves against the spring fingers 68-84, the sloping shoulders 56 and 58 of projections shift their points of contact with the fingers 68-84 toward their fixed ends thereby causing a rapid increase of spring finger pressure on plate member 14 and halting movement of the plate member 14.

It will be noted that guide pins 118 and 120 are fixedly mounted in orifices 122 and 124 in guard member 16 and extend through spaces 126 and 128 of flat spring plate 14 and ports 116 of movable plate member 12 to engage orifices 42 and 44 of seat member 10. These guide pins allow the flat spring plate and movable plate member 12 to be aligned properly with respect to each other and to prevent any rotation of the plates.

When the pressure in fluid ports 24, 26 and 28 is reduced sufficiently to a level below that force generated by the spring plate fingers 68-84, the movable plate member 12 is returned to its normal sealing position.

Figure 2:
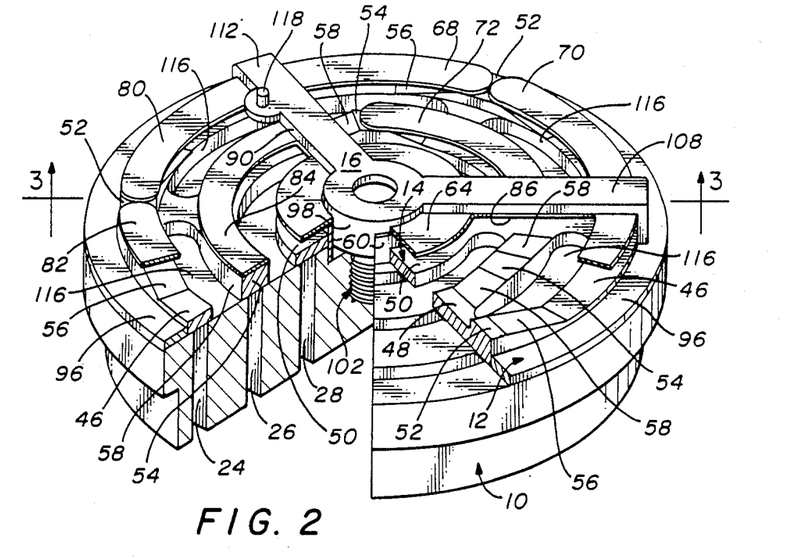
FIG. 2 is a perspective view, partly in cross-section, of a plate valve assembly according to the present invention utilizing a plate member with projections thereon and a flat spring plate member having resilient spring fingers thereon in contact with the plate member projections to bias the plate member against and seal fluid ports in the valve seat.

FIG. 2 is a perspective view, partly in cross-section, of the compressor valve assembly according to the present invention in its unitary state. As can be seen in FIG. 2, seat member 10 has the arcuate fluid ports 24, 26 and 28 each of which is sealed by the lower surface of sealing members 46, 48 and 50 of movable plate member 12. Spring fingers 68 and 70 and 80 and 82 rest on projections 52 while spring fingers 72 and 84 rest upon projections 54 on movable plate 12. Since the central portion 64 of flat spring plate 14 is resting in a fixed position on the upper edge 92 of hollow cylindrical spacer 60, spring fingers 68-84 are resting upon projections 52 and 54, with a biasing pressure which urges movable plate member 12 against seat member 10 to seal the fluid ports 24, 26 and 28. When sufficient pressure or suction is applied through ports 24, 26 and 28, plate member 12 is forced in a direction toward flat spring plate 14.

As can be seen in FIG. 2 the inside diameter of the inner most flat surface ring 50 of movable plate member 12 is on the outside of cylindrical spacer 60. Thus spacer 60 allows and guides the movement of plate 12 in its axial direction. Since radial arms 86 and 90 of flat spring plate 14 are under the radial arms 112 and 108 of the guard 16, they are held rigid and prevented from moving and since the central portion 64 of the flat spring plate 14 is also under the arms 108, 110 and 112 of guard 16 it cannot move and is held in fixed relationship to the seat member 10. However, the fingers 68-84 are made of a resilient material such as steel and can bend and move outwardly in the open space between the arms 108, 110 and 112 of the guard 16. This construction allows the movable plate member 12 to move toward the flat spring plate 14 and because plate 12 has projections 52 and 54 thereon, the movement of plate member 12 axially about the hollow cylindrical spacer 60 toward the spring plate 14 thereby bends only the spring plate fingers 68-84 and allows the fluid passage ports 24, 26 and 28 to be simultaneously and uniformly uncovered by the movement of the plate member 12. The small amount of travel or acceleration distance, L, (see FIG. 3) of a corresponding plate member 12 in the prior art (0.140 inches in U.S. Pat. No. 4,184,508) allows for little change of pressure, $F_L$, on plate member 12 over that distance regardless of the area of fluid passage ports such as 24, 26 and 28 or the area of the fluid passage ports 116 in plate member 12. With the greater travel distance, L, of the present invention (0.170 to 0.200 inches because of the flat spring and sealing plate construction), the areas of the fluid passage ports 24, 26 and 28 in seat member 10 and movable plate member 12 become the essential limiting factors for change in pressure on plate member 12. This increased travel distance, L, further enhances fluid flow through the valve.

Figure 3:
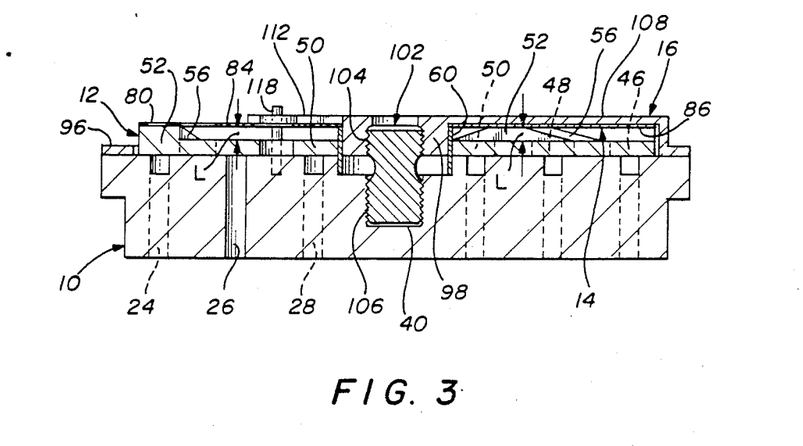
FIG. 3 is a detailed vertical cross-section of the plate valve according to the invention taken along lines 3—3 of FIG. 2.

FIG. 3 is a cross-sectional view of the novel plate valve taken along lines 3—3 of FIG. 2. It can be more clearly seen in FIG. 3 how the spring finger 80 rests on projection 52 and spring finger 84 rests on projection 54.

Although threaded orifice 40 in seat member 10 is shown in FIGS. 1, 2, and 3 to be partially formed in base member 10, it may be extended all the way through base member 10 in order that the valve can be mounted with a bolt in some installations.

The seat member 10 is preferably made of steel but could be cast and would require more or less machining depending upon how the seat member 10 is made.

Movable plate member 12 is preferably made of a plastic formed by injection molding. It of course, may also be made of metal such as steel but the results are not as satisfactory as with plastic. As is well-known in injection molding, the plastic is softened by being passed along a heated barrel by means of a reciprocating screw. The screw has the additional function of a ram which injects the softened plastic very rapidly into a cooler steel mold at a high pressure. After cooling, of course, the mold is opened and the article is removed. In the present case, polyetheretherketone polymer pellets are dried for at least three hours of a temperature of about 150° centigrade to remove moisture from the pellets. The dried polymer pellets are then fed into a heated reciprocating screw barrel of a center feed mold. The reciprocating screw barrel of the mold is heated to a temperature in the range of 350°–380° C. for receiving and melting the polymer pellets. The mold itself is heated to a temperature in the range of 150°–180° C.

prior to receiving the melted polymer from the reciprocating screw barrel. The mold is then filled with the melted polymer by means of the reciprocating screw in the barrel which obtains proper mixing and pressurizing of the polymer. Once the mold is filled, the temperature of the mold is raised to 300° C.±5° C. to anneal the plastic in the mold. This temperature is maintained for a period of two to five minutes to expand the polymer to fill the entire mold and relieve stress in the molded plate. An empirically designed gated mold is utilized instead of the typical flow mold so as to minimize knit lines. As used herein "a center gated" mold means essentially a single injection location near the center of the mold as opposed to a host of separate injection locations at multiple points on the mold.

Figure 6:
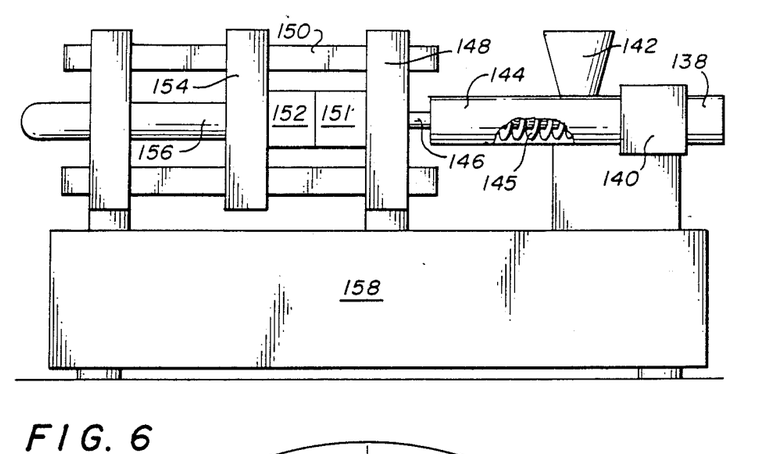
FIG. 6 is a diagrammatic representation of a typical injection molding machine.

A typical injection molding machine is shown in diagrammatic form in FIG. 6. A motor 138, such as a hydraulic motor, may be used to turn a reciprocating screw 145 in an injection cylinder or barrel 144. Hydraulic cylinder and piston 140 allow the screw 145 to reciprocate. Hopper 142 contains the dried polymer pellets which are to be fed into the barrel 144 by the reciprocating screw 145. The barrel 144 is heated to a temperature in the range of 350°-380° C. to melt the polymer pellets. A nozzel 146 center feeds the melted plastic through a fixed platen 148 which is coupled to a first half 151 of the mold. The other half of the mold 152 is held by movable platen 154 so that the two mold halves 151 and 152 can be moved apart or together by means of hydraulic cylinder and piston 156. The entire assembly is mounted on a base 158. The machine is typical in the art and is old and well-known.

It is imperative, however, that the steps set forth above be followed in sequence and in detail to obtain a plate which is flat so that it can properly seal the fluid flow orifices in the valve and which has minimum stresses in it. Those steps, again, are:
1. Drying the polymer pellets for a minimum of three hours at 150° C.;
2. Injecting the polymer into a center gated mold by means of an injector coupled to a barrel with a reciprocating screw and wherein the barrel is heated to a temperature in the range of 350°-380° C. and the mold is heated to a temperature in the range of 150°-180° C.; and
3. Raising the temperature of the mold to 300° C.±5° C. and holding that temperature for two to five minutes to anneal the plastic plate in the mold.

Figure 7:
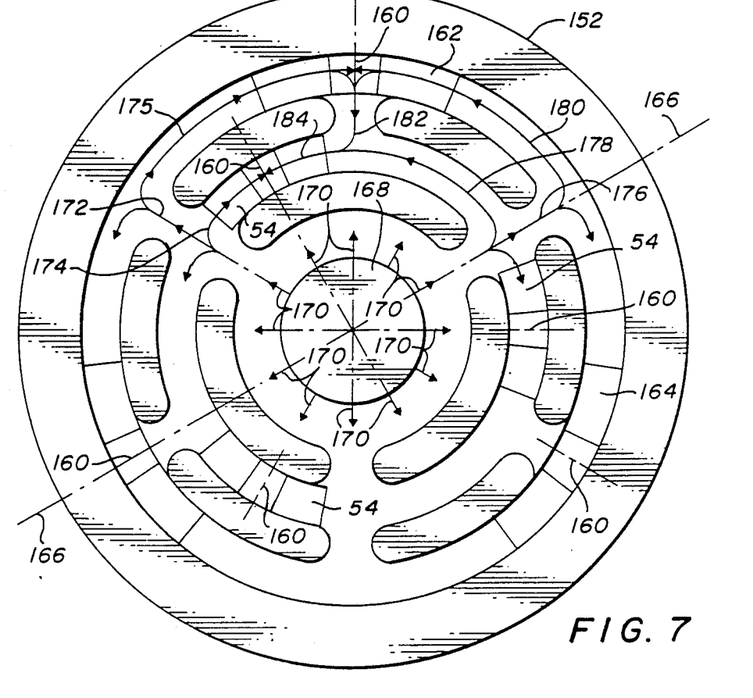
FIG. 7 is a plan view of one-half of the mold used to obtain the plastic sealing plate of the present invention.

FIG. 7 is a plan view of one-half 152 of the mold illustrating the flow of the plastic through the mold to minimize the number of knit lines on the plastic plate and to cause the knit lines to be located at points of reinforced thickness to minimize stress and increase the life of the plate. These knit lines are caused to be located at the center of the projections or nubs on the plate. As shown in FIG. 7, the center gated mold allows the plastic to flow uniformly about the center island 168 as indicated by the arrows 170 such that the flow of plastic along lines 172, 174, 175, 176, 178, 180, 182 and 184 causes knit lines to be formed where indicated by the numeral 160 at the center of the location of projections 54 and 162. The flow is shown in only one area of the mold to simplify the drawings.

The diameter of plate 152 about which the bending stress will occur will always fall through the center of one of the projections or nubs 54 on an inner ring. Thus if pressure is applied to nubs 162 and 164 on the outer ring as shown in FIG. 7, the bending moment will be about diameter 166. It will be noted that diameter 166 lies along the center line of one of the nubs 54 on the middle ring. Close inspection of the mold half 152 shown in FIG. 7 will indicate that for pressure applied to any two of the projections on the outer ring, the resultant bending torque will fall across one of the projections 54 on the middle ring. In like manner, pressure applied to any two of the projections 54 on the middle ring will cause a bending stress or torque which passes through one of the projections on the outer ring. Since a greater thickness of material is required to form the projections on the middle and outer rings, additional strength is provided at those stress points where the knit lines are formed. Thus where the bending stress lines pass through portions of the plate of normal thickness, no knit lines occur and where the stress line passes through the location of a knit line, an extra thick material is used to form the projection and thus extra strength is provided at that location.

It is evident that with the process as set forth above and the mold designed as indicated in FIG. 7, a plastic sealing plate is obtained which does not warp but stays flat without substantial additional machining. In addition, the number of knit lines on the plate are minimized and those that are formed are located at points of minimum stress because of the thickness of the material at those points. Thus the life of the plate is increased.

Flat spring plate 14 may be laser cut of spring steel or it could also be formed by stamping. It is important that the plate member be formed in a flat configuration. It is difficult to form spring plates with convex or concave curved fingers. A flat plate is simple and economical to construct and by placing the projections 52 and 54 on movable plate member 12, a compact configuration can be obtained with extremely efficient operation of the device.

The guard 16 may be made in any well known manner such as by casting or cutting or welding. The device could operate of course without guard 16 as stated earlier but it serves to hold the assembly together without loss of parts into the compressor upon failure of stud 102.

Figure 4:
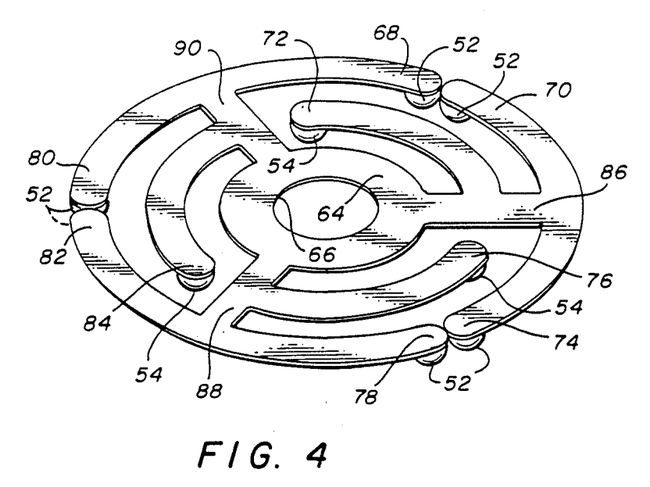
FIG. 4 is a perspective view of an alternate embodiment of the flat spring plate.

FIG. 4 is a perspective view of an alterative embodiment of spring plate 14. In this embodiment, the projections 52 and 54 are placed on the ends of the resilient fingers 68-84 instead of on the sealing members 46, 48 and 50 of movable plate member 12. The same operation occurs as discussed previously. In this embodiment, however, movable plate member 12 is flat and has no projections thereon since the projections 52 and 54 are formed on corresponding ones of the spring fingers 68-84.

Thus there has been disclosed a novel plate valve which utilizes a flat plate spring to bias a plastic movable plate member against the orifices in the seat member to seal the orifices until the pressure becomes sufficiently great. Because the spring plate is flat it is simple and economical to construct and because the movable plate member has projections thereon for receiving spring fingers from the spring plate there is sufficient spacing between the movable plate and the spring plate to allow the movable plate travel significantly increased distances to open or uncover the orifices in the seat member to enable proper operation of the valve and yet the valve is much smaller in size than the normal plate valve thus allowing a greater compressor efficiency.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A sealing apparatus for use in a compressor suction or pressure plate valve having a seat member with a plurality of fluid passage ports therethrough, said fluid passage ports being elongated, with the dimension of length being more than twice that of width and the sealing surfaces adjacent said ports being co-planar and lying in a first plane, said sealing apparatus comprising:
   a. a movable plate member having a like plurality of sealing members lying essentially in a second plane, said first and said second planes being parallel, said like plurality of sealing members being adapted for juxtaposed sealing engagement with said plurality of fluid passage ports in said seat member,
   b. a flat spring plate member having a central mounting region, said flat spring plate member having a plurality of normally essentially co-planar resilient flat spring fingers, and
   c. at least two projections integrally formed on said sealing members and extending outwardly from said plate member in a direction away from said seat member for severally receiving at least two resilient flat spring members urging said plate member against and sealing said fluid passage ports.

2. A sealing apparatus for use in a compressor suction or pressure plate valve having a seat member with a plurality of fluid passage ports therethrough, said fluid passage ports being elongated, the sealing surfaces adjacent said ports being co-planar and lying in a first plane, said sealing apparatus comprising:
   a. A movable plate member having a like plurality of sealing members lying essentially in a second plane, said first and said second planes being parallel, said like plurality of sealing members being adapted for juxtaposed sealing engagement with said plurality of fluid passage ports in said seat member, and
   b. a flat spring plate member having a central mounting region, said flat spring plate member having a plurality of normally essentially co-planar resilient flat spring fingers, and
   c. at least two projections integrally formed on said sealing members and extending outwardly from said plate member in a direction away from said seat member for severally receiving at least two resilient flat spring members urging said plate member against and sealing said fluid passage ports.

3. A sealing apparatus for use in a compressor suction or pressure plate valve having a seat member with a plurality of fluid passage ports therethrough, said fluid passage ports being elongated, the sealing surfaces adjacent said ports being co-planar and lying in a first plane, said sealing apparatus comprising:
   a. a movable plate member having a like plurality of sealing members lying essentially in a second plane, said first and said second planes being parallel, said like plurality of sealing members being adapted for juxtaposed sealing engagement with said plurality of fluid passage ports in said seat member, and
   b. a flat spring plate member having a plurality of normally essentially co-planar resilient flat spring fingers, and
   c. at least two projections integrally formed on said sealing members and extending outwardly from said plate member in a direction away from said seat member for severally receiving at least two resilient flat spring members urging said plate member against and sealing said fluid passage ports.

* * * * *